(12) United States Patent
Singh et al.

(10) Patent No.: US 10,715,996 B1
(45) Date of Patent: Jul. 14, 2020

(54) TRANSPARENT PROVISIONING OF A THIRD-PARTY SERVICE FOR A USER DEVICE ON A TELECOMMUNICATIONS NETWORK

(71) Applicant: T-Mobile USA, Inc., Bellevue, WA (US)

(72) Inventors: Manish Singh, Issaquah, WA (US); Ravikumar Subramanian, Bothell, WA (US); Asmita Kamble, Redmond, WA (US); Ganesh Balgum, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/433,955

(22) Filed: Jun. 6, 2019

(51) Int. Cl.
*H04W 12/00* (2009.01)
*H04W 12/06* (2009.01)
*H04W 4/14* (2009.01)
*G06Q 20/08* (2012.01)

(52) U.S. Cl.
CPC .. *H04W 12/00514* (2019.01); *G06Q 20/0855* (2013.01); *H04W 4/14* (2013.01); *H04W 12/0602* (2019.01); *H04W 12/0608* (2019.01)

(58) Field of Classification Search
CPC ....... H04W 12/00514; H04W 12/0602; H04W 12/0608; H04W 4/14; G06Q 20/0855
See application file for complete search history.

(56) References Cited

U.S. PATENT DOCUMENTS

| | | | |
|---|---|---|---|
| 8,045,540 B2 | 10/2011 | Bajko et al. |
| 8,285,983 B2 | 10/2012 | Hallenstal et al. |
| 8,503,462 B2 | 8/2013 | Damola et al. |
| 8,520,664 B2 | 8/2013 | Betti et al. |
| 8,549,615 B2 | 10/2013 | Barriga et al. |
| 8,812,685 B2 | 8/2014 | Fuller |
| 8,844,011 B2 | 9/2014 | Przybysz et al. |
| 9,143,482 B1 | 9/2015 | Breau et al. |
| 9,686,284 B2 | 6/2017 | Shah et al. |
| 9,749,309 B2 | 8/2017 | Horn et al. |
| 9,900,347 B2 | 2/2018 | Lindholm et al. |
| 9,992,183 B2 | 6/2018 | Engelhart |
| 10,148,655 B2 | 12/2018 | Shah et al. |
| 2003/0005280 A1 | 1/2003 | Bobde et al. |
| 2004/0128542 A1 | 7/2004 | Blakley, III et al. |
| 2004/0153667 A1 | 8/2004 | Kastelewicz et al. |

(Continued)

*Primary Examiner* — Ernest G Tacsik
(74) *Attorney, Agent, or Firm* — Perkins Coie LLP

(57) ABSTRACT

The disclosed systems and methods authenticate a user of a telecommunications network for a third-party service provider to seamlessly provision a third-party service. A The telecommunications network receives an indication that a user device on the telecommunications network received an input by a user to access the third-party service. In response, the telecommunications network obtains a network-based identifier (e.g., IP address) that uniquely identifies the user device and associated user, determine that the user is eligible for the third-party service based on the user's subscribed service plan, and communicates information to enable the third-party service provider to automatically provision the third-party service on the user device without needing additional input to activate the third-party service or authenticate the user with the third-party service on the user device.

20 Claims, 9 Drawing Sheets

(56) References Cited

U.S. PATENT DOCUMENTS

| | | |
|---|---|---|
| 2004/0225878 A1 | 11/2004 | Costa-Requena et al. |
| 2005/0090256 A1 | 4/2005 | Dutta |
| 2006/0021019 A1 | 1/2006 | Hinton et al. |
| 2008/0086771 A1 | 4/2008 | Li et al. |
| 2008/0148351 A1 | 6/2008 | Bhatia et al. |
| 2008/0155659 A1 | 6/2008 | Gazier et al. |
| 2009/0061820 A1 | 3/2009 | Patel et al. |
| 2009/0064284 A1 | 3/2009 | Poston et al. |
| 2009/0113523 A1 | 4/2009 | Vedula et al. |
| 2009/0119182 A1 | 5/2009 | Krstulich et al. |
| 2009/0172397 A1 | 7/2009 | Kim |
| 2009/0210536 A1 | 8/2009 | Allen et al. |
| 2010/0048195 A1 | 2/2010 | Zhu |
| 2010/0138905 A1 | 6/2010 | Kass et al. |
| 2010/0263032 A1 | 10/2010 | Bhuyan et al. |
| 2010/0287606 A1 * | 11/2010 | Machani .............. G06F 21/34 726/7 |
| 2011/0096746 A1 | 4/2011 | Belling et al. |
| 2011/0179273 A1 | 7/2011 | Hjelm et al. |
| 2011/0256849 A1 | 10/2011 | Dutta |
| 2011/0299462 A1 | 12/2011 | Imbimbo et al. |
| 2012/0023490 A1 | 1/2012 | Goebl et al. |
| 2012/0023556 A1 | 1/2012 | Schultz et al. |
| 2012/0042371 A1 | 2/2012 | Gur et al. |
| 2012/0191976 A1 | 7/2012 | Blot-Lefevre et al. |
| 2012/0265990 A1 | 10/2012 | Liu et al. |
| 2013/0024688 A1 | 1/2013 | Wen et al. |
| 2013/0081123 A1 | 3/2013 | Przybysz et al. |
| 2013/0139241 A1 | 5/2013 | Leeder |
| 2013/0159520 A1 | 6/2013 | Engelhart |
| 2013/0227663 A1 | 8/2013 | Cadenas Gonzalez |
| 2014/0126714 A1 | 5/2014 | Sayko |
| 2014/0223452 A1 | 8/2014 | Santhanam et al. |
| 2014/0297879 A1 | 10/2014 | Gao et al. |
| 2014/0337227 A1 * | 11/2014 | Dua ...................... G06Q 20/20 705/44 |
| 2015/0142879 A1 | 5/2015 | Rameil-Green |
| 2015/0365403 A1 * | 12/2015 | Counterman ....... H04L 63/0876 726/9 |
| 2018/0278599 A1 | 9/2018 | Engelhart |
| 2019/0068597 A1 | 2/2019 | Shah |

\* cited by examiner

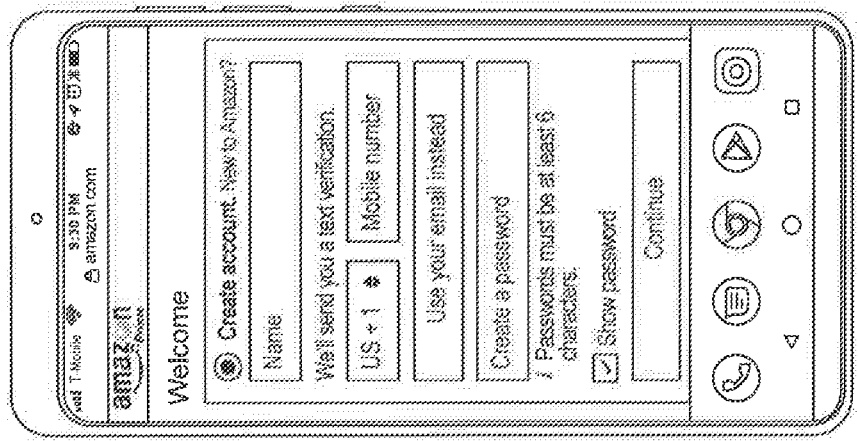
FIG. 1
(PRIOR ART)

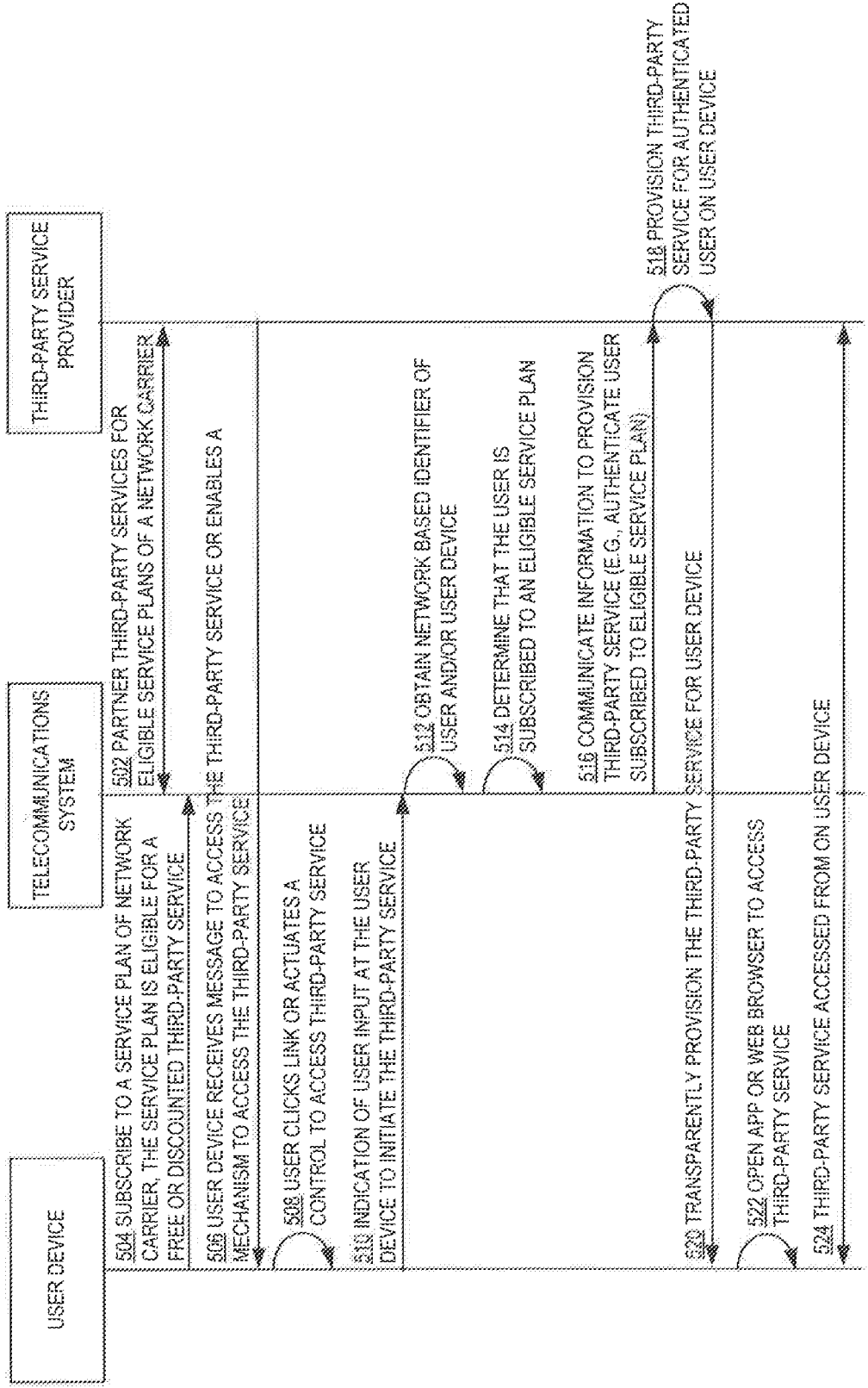

US 10,715,996 B1

TRANSPARENT PROVISIONING OF A THIRD-PARTY SERVICE FOR A USER DEVICE ON A TELECOMMUNICATIONS NETWORK

BACKGROUND

A company may partner with another company to offer services for their mutual benefit. For example, a first company that has many customers (users of the first company's services) may work with a second company to provide discounted or free services or products from the second company to the first company's customers. In doing so, the first company provides a benefit to its customers while the second company expands its reach to new customers. There are various problems associated with such an arrangement. For example, the customers of the first company would need to subsequently re-authenticate themselves with the second company to access the discounted or free services or products.

For example, FIG. 1 is a block diagram illustrating a sequence of displays on a user device to provision a third-party service over a telecommunications network. As shown, a web browser of a user device on a telecommunications network is utilized to access AMAZON PRIME, which is a paid subscription service offered by AMAZON. The user device displays a web or mobile application ("app") form for the customer to input authenticating information to access the third-party service on the user device. Once the authenticating information is complete, submitted, and processed, the customer can access the third-party service at the user device.

Moreover, when a first company offers a service of the second company as a bonus service, a customer is typically given a passcode to redeem the bonus service. The additional burden of remembering and entering a passcode leads the customer to forego redeeming the bonus service. Moreover, oftentimes there are delays between when a customer becomes eligible for a benefit and when the customer is apprised that the benefit is available. As a result, the customer is less likely to redeem the bonus service because the passcode was lost, misplaced, or the customer simply chooses to avoid the burdensome process of registering for the bonus service. These and other drawbacks obviate the benefits that should flow from the partnership when providing bonus services to customers.

BRIEF DESCRIPTION OF THE DRAWINGS

Embodiments of the present technology will be described and explained through the use of the accompanying drawings.

FIG. 1 is a block diagram illustrating a sequence of displays on a user device to provision a third-party service over a telecommunications network.

FIG. 5 is a flow diagram illustrating a method to transparently provision a third-party service for a user device on a telecommunications network.

Figure 2:
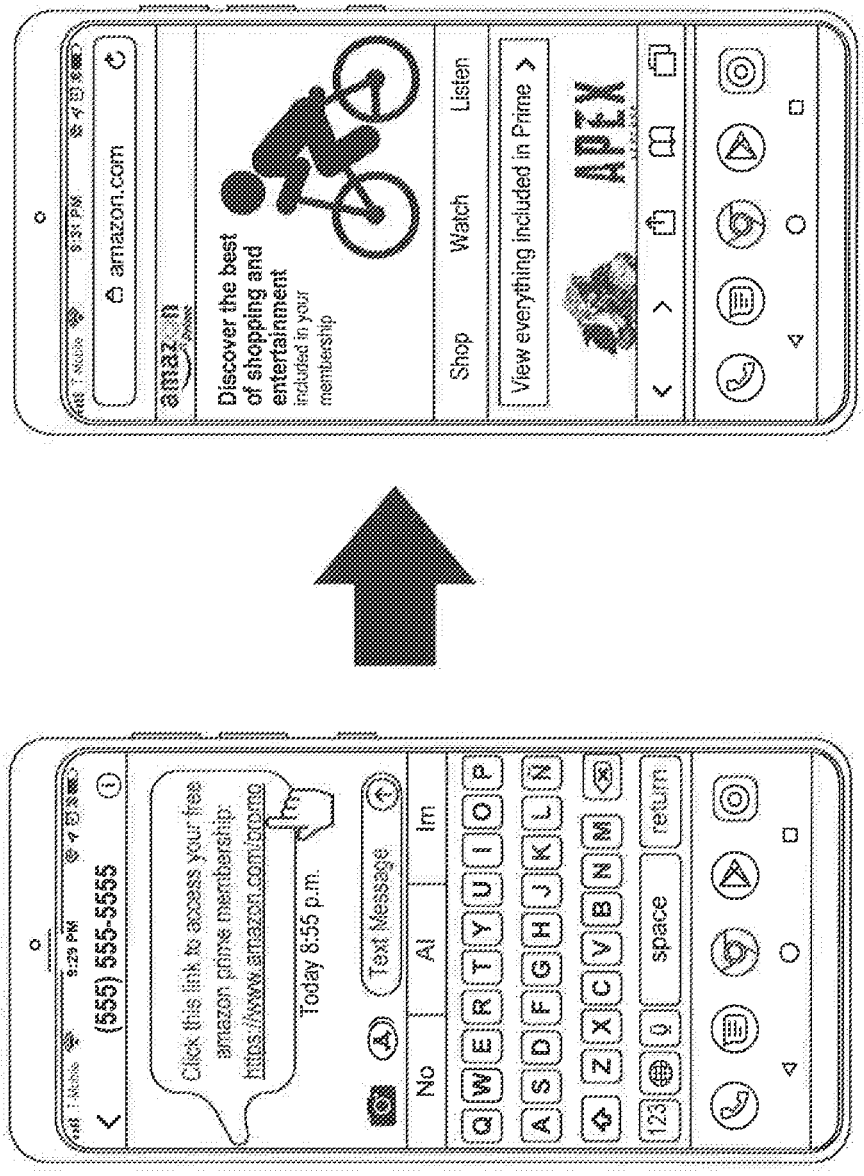
FIG. 2 is a block diagram illustrating a sequence of displays on a user device to transparently and efficiently provision a third-party service over a telecommunications network.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

In the following description, for the purposes of explanation, numerous specific details are set forth in order to provide a thorough understanding of implementations of the present technology. It will be apparent, however, to one skilled in the art that implementations of the present technology can be practiced without some of these specific details.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to: floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), field programmable gate arrays (FPGAs), magnetic or optical cards, flash memory, or other type of media/machine-readable medium suitable for storing electronic instructions. The phrases "in some embodiments," "according to some embodiments," "in the embodiments shown," "in other embodiments," and the like generally mean the particular feature, structure, or characteristic following the phrase is included in at least one embodiment of the present technology, and can be included in more than one implementation. In addition, such phrases do not necessarily refer to the same implementations or different implementations.

Overview

Systems and methods disclosed herein generally relate to utilizing a network-based identifier of a telecommunications network to transparently provision a third-party service for a user of a user device. The systems and methods relate to a technique for transparently provisioning a third-party service for a user based on an IP address of the user device on a telecommunications network. For example, a wireless service provider can provide to its users with third-party services and hyperlinks in text messages that allow a user to simply click on the links to receive services from the third party. The wireless service provider authenticates the users and provides certain information for those users to the third-party so that the third party can authorize or register those users before providing the services.

The disclosed techniques can use a unique customer identifier or device identifier to transparently authenticate a customer of a telecommunication service provider's network with a third-party service. In some embodiments, a process flow proceeds as follows: (i) a customer signs-up for a service plan of a network carrier; (ii) the customer receives an SMS or MMS text message to activate a third-party service; and (iii) the customer clicks on a link in the text message to transparently provision the third-party service.

Unlike existing solutions that require the customer (also referred to as a "user") to manually authenticate with the third-party service provider, the disclosed solution bypasses an authentication process that is performed by the customer. Instead, once the customer clicks on the received link, the telecommunications network identifies the customer based on the user device's unique IP address (or other unique ID associated with the user's mobile device), validates that the customer associated with that IP address signed-up for an eligible service plan, and authenticates the customer for the third-party service provider. As such, based on a single input, the customer can both activate the third-party service and authenticate the customer in a manner that is transparent to the customer.

For example, FIG. 2 is a block diagram illustrating a sequence of displays on a user device to transparently provision a third-party service over a telecommunications network. As shown, a user device receives an SMS or MMS text message that includes a link to access a third-party service. Once the user clicks the link, the user device is routed to access the third-party service without requiring the user to input any authenticating information. Instead, the third-party service is transparently activated and authenticated to substantially instantaneously display the third-party service website for the user.

The embodied systems and methods can provision third-party services to users of telecommunications networks via network-based processes. In some embodiments, a telecommunications system determines that a user is eligible for a bonus service such as AMAZON PRIME or GOOGLE ONE and authenticates the user in response to a single input by the user to access the bonus service on the user device over the telecommunications network.

In response to the user's input, the systems and methods update or modify a database of a telecommunications network (i.e., a network that provides communication services to users) and facilitate transparent provisioning or establishment of third-party services. The database may store and/or track activation and/or authentication information associated with the user and the third-party service administered by a third-party service provider.

When the user subscribes to an eligible service plan of a network carrier, the user is exposed to a mechanism for accessing a discounted or free third-party service (referred to herein as a "bonus" service because it is a discounted or free service for users of eligible service plans of the network carrier). For example, a third-party service provider can send an SMS/MMS text message to the user of the user device on the telecommunications network. The text message may include a link to access a bonus service. The procedure for redeeming the bonus service typically requires an activation process and a separate authentication process. More specifically, a user is required to input a variety of personal information and information about the subscribed service plan when the user signs up for network services. For example, an activation process requires the user to input identifying information about the user and the eligible service plan. The authentication process may require the user to input personal information such as an identifier and passcode.

The disclosed embodiments forego the need for users to again supply identifying or authenticating information to activate a third-party service and manually authenticate the user to access the third-party services. In some embodiments, the user can redeem the bonus service by clicking on the link, which causes the telecommunications system to query a database to confirm that the user is eligible to redeem the bonus service. The disclosed systems and methods can automatically redeem the bonus service by utilizing information provided by network-based components to authenticate the user. This involves determining the eligibility of the user's service plan for the bonus service, determining an availability of a bonus service, and so on. Thus, the disclosed systems and methods, via a database of the telecommunications system, manage the redemption of bonus services provided to users from third-party service providers.

In one example, a network carrier partners with various companies to provide discounted or free services and provides a weekly or periodic promotional event. The network carrier promotes the companies or sponsors by advertising the product or service, which is then either given away or sold at a discount during a promotional event (e.g., either online or within an associated retail store or location). Hence, the network carrier can associate itself with third-parties that meet a desired profile (e.g., a youth market) and, at the same time, develops a social network with its customers, who benefit from the promotions and increase their activity in both online and retail environments.

In practice, the third-party that administers the bonus service may control when a link to the bonus service is sent to the user. As such, links for bonus services may be delayed by several weeks after the user subscribed to an eligible service plan. These problems are exacerbated by burdening the user for inputs to activate the bonus service or authenticate the user. For example, the link received by a user for activation or authentication may require that the user input identifying information such as a username, passcode, or other information which may not be readily available to the user after becoming eligible for the bonus service. In one example, a user that purchases an eligible service plan may have a passcode printed on the receipt for activation or authentication processes administered by the third-party bonus service provider. When the user receives the third-party link to the bonus service, the user would be required to input the passcode from the receipt.

The disclosed embodiments overcome the drawbacks of existing systems by leveraging the backend infrastructure of a telecommunications system to activate a bonus service and authenticate the user of the bonus service. For example, a telecommunications server may have a database that stores identifying information about users of a carrier network, their respective service plans, and information associated with bonus services administered by third-party service providers. Accordingly, the database can be queried to determine a current eligibility for provisioning a bonus service to the user based on a rules-based process performed by the telecommunications server.

When a bonus service is currently available for redemption based on the rules-based process, the disclosed systems and methods update the database with a credit for the user. When the telecommunications system or third-party service provider receives an indication that the user seeks to access the bonus service, the telecommunications server presents authenticating information to the third-party service provider, which uses that information to activate the bonus service and authenticate the user. The user may then transparently redeem the bonus service without needing to manually input any additional information.

Example of a Network Environment

The disclosed systems and methods utilize telecommunications network-based servers, components, engines, and/or processes for activation of bonus services and authentication of users for bonus services that are provisioned and administered by third-party entities (e.g., partner companies, sponsors, and/or brands).

Figure 3:
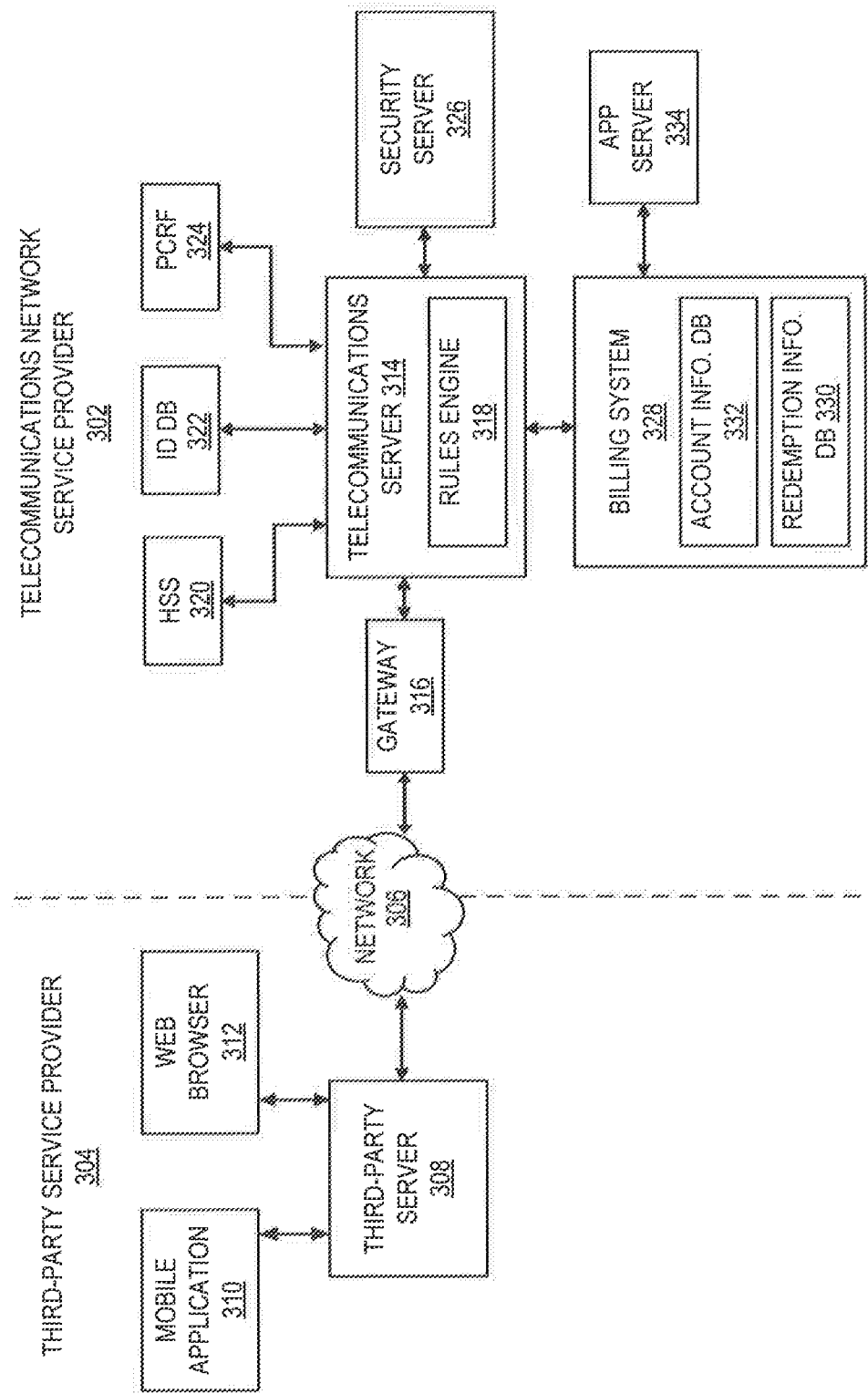
FIG. 3 is a block diagram illustrating a network environment to transparently provision third-party services for a user device on a telecommunications network.

FIG. 3 is a block diagram illustrating a network environment for transparently provisioning third-party services for a user device on a telecommunications network. The network environment 300 includes a telecommunications network service provider 302 and a third-party service provider side 304. Each component of the network environment 300 may include combinations of hardware and/or software to process data or information, perform functions, communicate over the network 306, and the like. For example, any component of the network environment 300 may include a processor, memory or storage, a network transceiver, a display, OS and application software (e.g., for providing a user interface), and the like. Other components, hardware, and/or software included in the network environment 300 that would be well known to persons skilled in the art are not shown or discussed herein for the sake of brevity.

A third-party server 308 performs, or causes performance of, a third-party service at one or more user devices associated with a user. A mobile application 310 ("mobile app 310") or web browser 312 provided on a user device (e.g., smartphone, tablet, or laptop) and/or OS applications or launchers perform, render, or assist in providing the third-party service or product. For example, the user may be a customer of the telecommunications network service provider 302 (e.g., a network carrier) that provides a telecommunications network for use by the mobile app 310 and/or web browser 112 receive and send data and other communications. The user may visit a webpage via the mobile app 310, web browser 312, or OS-based applications and perform an action or activity presented via the webpage, such as click a button, play a game, answer a question, provide feedback, visit the webpage, watch a video or other content, register for a service, share or blog about a topic, and so on.

A user device (not shown) is a computing device that can interact with the system 100. Examples of user devices include smartphones (e.g., GOOGLE PIXEL, APPLE IPHONE, SAMSUNG GALAXY), tablet computers (e.g., APPLE IPAD, MICROSOFT SURFACE), computers (e.g., GOOGLE CHROMEBOOK, APPLE MACBOOK, LENOVO THINKPAD), and any other device that is capable of exchanging data over the network 306 including smart watches or other wearable devices.

In operation, a message including a link to a third-party service may be sent to the user device. For example, an SMS text message sent by the third-party server 308 to the user device executing the mobile app 310 and/or web browser 312 may include a link to the third-party service. In general, any actuatable control may be presented to the user on the user device on, for example, the mobile app 310 or the web browser 312. The user can actuate the control to initiate an activation process or an authentication process. For example, clicking on a link in an SMS text message may cause the user device to open the mobile app 310 or the web browser 312 to access a third-party service. As such, the user of a user device on the telecommunications network provided by the telecommunications network service provider 302 can receive a link from the third-party service provider 304, which the user can actuate to access the third-party service.

In some embodiments, clicking the link initiates one or more events to activate a third-party service and/or authenticate the user for the third-party service via the mobile app 310 or web browser 312. The third-party server 308, in response to the triggering of the event(s), transmits, via a backend interface, information associated with the user or third-party service to the telecommunications server 314 over the network 306. The network 306 may be provided by the telecommunications network service provider 302, which may include a cellular or other telecommunications network, the Internet, and/or another network. The network 306 may include any combination of private, public, wired, or wireless portions. The data or information communicated over the network 306 may be encrypted or unencrypted at various locations or along different portions of the network 306.

Communications received from the backend interface of the telecommunications server 314 are initially managed by a network gateway 316, which performs various authentication processes (e.g., via the OAuth 2.0 protocol), and routes communications to the telecommunications server 314 (or to one of multiple telecommunications servers) of the telecommunications network service provider 302.

The telecommunications server 314 includes a rules engine 318, which performs logic-based qualification determinations for third-party service redemptions. For example, the rules engine 318 may apply various restrictions or parameters to users seeking to access third-party services. Examples of restrictions include inventory or amount restrictions, customer restrictions, group or family restrictions, location restrictions, time restrictions, and so on.

When applying third-party service redemption rules, the rules engine 318 accesses and/or retrieves information from various network specific components. In some embodiments, the rules engine 318 receives customer identity information from a home subscriber server (HSS) 320 (or home location register (HLR)), which provides subscription-related information such as subscriber profiles, performs authentication/authorization processes for users, provides information associated with a subscriber's location and/or IP address information, and so on.

In addition, the rules engine 318 may receive information from an ID database 322, such as a database managed by the network carrier. The ID database 322 provides user device information (e.g., international mobile subscriber identity (IMSI) information or mobile station international subscriber directory number (MSISDN) information), billing account number (BAN) information, primary account holder (PAH) information, and so on, for a customer or group of customers (e.g., family). Further, the rules engine 318 can access or receive information from a policy and charging rules function (PCRF) component 324. The PCRF 324 operates with the core of the telecommunications network, accesses subscriber databases (e.g., ID DB 322) and other network functions, such as a charging system (not shown) configured to access, identify, and/or apply a current billing policy associated with the subscriber.

In some embodiments, the telecommunications server 314, via the rules engine 318, accesses a security server 326 of the telecommunications network service provider 302. The security server 326 may include components configured to monitor and detect fraudulent activity within the network 306. For example, the security server 326 may run processes configured to identify patterns (e.g., fraudulent or suspicious) of activity associated with a certain user or device identifier (e.g. IMSI, IP address, MAC), such as multiple accesses or redemption requests. The rules engine 318 may query the security server 326 to authenticate a customer, device, and/or reward redemption request by checking, against data stored by the telecommunications server 314, the timing of a request, the IP address of the request, the account associated with the request, the login credentials provided along with a request, and so on.

In some embodiments, the telecommunications server 314 accesses and/or utilizes a billing system 328 to track or manage users or obtain information about the user. For example, the billing system 328 may include, for some or all customers of the telecommunications network service provider 302, a redemption information database 330 and an account information database 332, which is associated with regular customer activities (e.g., data, text, and/or voice services) within the telecommunications network. The billing system 328 may interface with an application server 334, internal to the telecommunications network service provider 302, which facilitates communications between the telecommunications network service provider 302 and mobile app (e.g., mobile app 310) and the billing system 328.

Although not required, aspects of the environment network are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," are generally used interchangeably herein, as are "mobile device" and "handset," and refer to any of the above devices and systems, as well as any data processor.

Aspects of the network environment 300 can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a local area network (LAN), wide area network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the devices may include network communication components that enable the devices to communicate with remote servers or other portable electronic devices by transmitting and receiving wireless signals using a licensed, semi-licensed, or unlicensed spectrum over communications network, such as network 306. In some cases, a telecommunication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The network 306 may also include third-party communications networks such as a global system for mobile (GSM) communications network, a code/time division multiple access (CDMA/TDMA) mobile communications network, a 3rd or 4th generation (3G/4G) mobile communications network (e.g., general packet radio service (GPRS/EGPRS)), enhanced data rates for GSM evolution (EDGE), universal Mobile Telecommunications System (UMTS), or Long Term Evolution (LTE) network), 5G mobile communications network, IEEE 802.11 (WiFi), or other communications network. Thus, the user device is configured to operate and switch among multiple frequency bands for receiving and/or transmitting data.

Transparent Provisioning of Third-Party Services on a Telecommunications Network The disclosed embodiments provision third-party services based on a network-based identifier that is determined from the connection of the user device to a telecommunications network. The user of the user device can be authenticated based on the network-based identifier to activate the third-party service without needing the user to input authenticating information. As such, activation of the third-party service can be completely transparent to the user of the user device on the telecommunications network, such as a cellular network provided by a network carrier.

Figure 4:
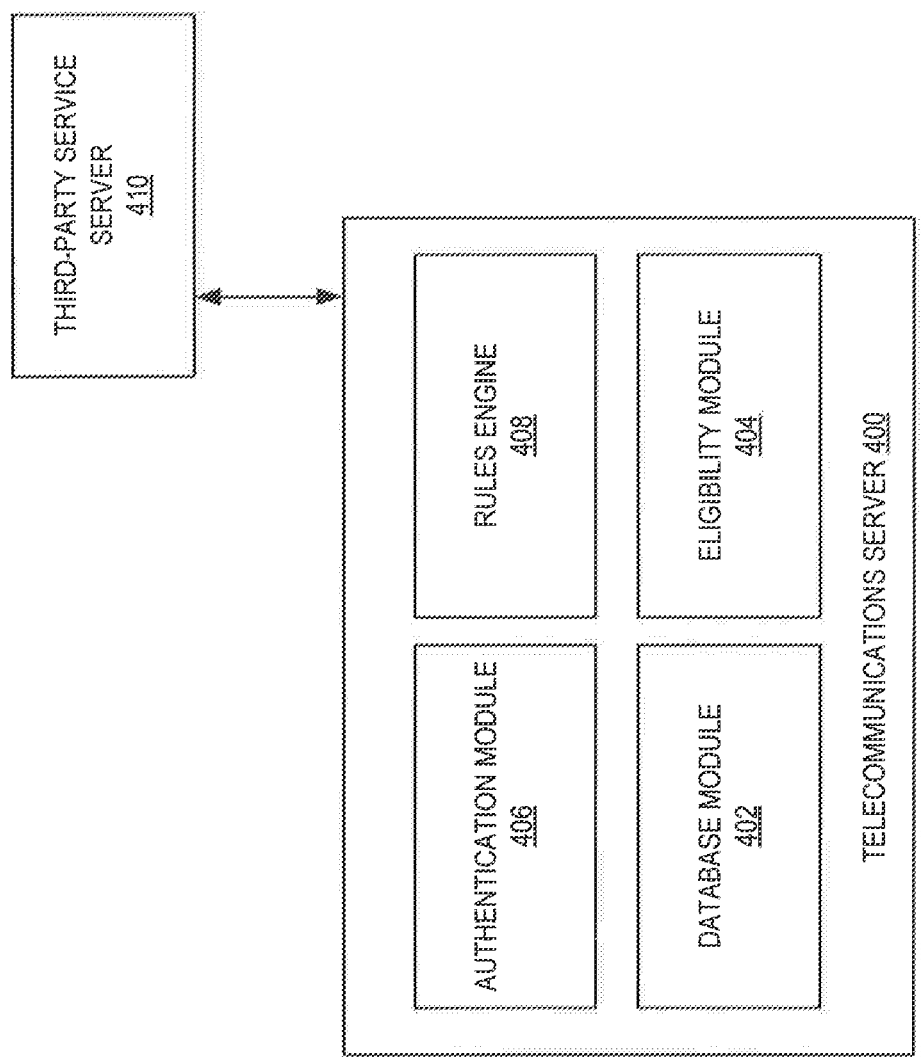
FIG. 4 is a block diagram illustrating modules of a telecommunications server that can transparently provision a third-party service over a telecommunications network.

FIG. 4 is a block diagram illustrating modules of a telecommunications server that can implement at least some aspects of the disclosed embodiments. The telecommunications server 400 includes functional modules or engines that are implemented with a combination of software (e.g., executable instructions, or computer code) and hardware (e.g., at least a memory and processor). Accordingly, as used herein, in some examples, a module or engine is a processor-implemented module or set of code and represents a computing device having a processor that is at least temporarily configured and/or programmed by executable instructions stored in memory to perform one or more of the particular functions that are described herein. For example, the telecommunications server 400 may include a database module 402, an eligibility module 404, authentication module 406, and a rules engine 408.

The database module 402 is configured and/or programmed to manage or store information that is used to transparently provision a third-party service by a third-party service provider. For example, the database module 402 may store information about network-based identifiers, users, user devices, service plans of a network carrier, and eligibility criteria for third-party services. The database module 402 can be updated with new subscriber information and third-party services. This information can be used by the telecommunications server 400 to authenticate users on behalf of third-party service providers. More specifically, the telecommunications server can implement rules-based processes to facilitate transparent provisioning of third-party services. For example, the database module 402 can update with information regarding a reward, credit, token, points, online currency, cryptocurrency, or tracking data based on information added to a billing system such as payments for a new subscription to a service plan.

The information stored by the database module 402 may be related or associated with the promotion and/or may be temporarily provided to users and expire after a certain period of time. For example, credits may be limited in what they can be redeemed for, such as limited to a specific product or service, limited to a specific brand or sponsor, limited to a certain redemption time period, limited in whether they are combined with other promotions, and so on. The credits may be associated with individuals or groups of individuals (e.g., a family).

Example information obtained by the telecommunications server 400 includes information associated with a user, information associated with a group of users, user equipment information (e.g., device type, make, model, operating system, and so on), geo-location or other location information, date and/or time information (e.g., a timestamp), context information associated with a user's online activities, information about a user's communication medium (e.g., which channel), and so on.

The eligibility module 404 is configured and/or programmed to determine a current eligibility of a user for provisioning of a third-party service or product based on a rules-based process. For example, the eligibility module 404 interfaces with the rules engine 408 to determine whether a user is eligible for a reward promoted by the network carrier. The eligibility module 404 may utilize criteria regarding whether a service plan for a network carrier is eligible for any third-party services. The eligibility criteria may include information about service plans, users, and user devices. For example, the eligibility criteria may limit third-party services to a group of service plans of the network carrier that are subscribed to within a particular time frame and geographic region. The eligibility module 404 may also manage information regarding which user devices are capable of accessing third-party services. For example, a service plan of a network carrier may be ineligible for a bonus service when a subscribed user device lacks a capability to properly render features of a third-party service (e.g. high definition movies or videos). The eligibility criteria may also include information about laws or regulations that limit offering third-party services to customers residing in or traveling through certain geographic regions.

The authentication module 406 is configured and/or programmed to manage or store information that is used authenticate a user seeking to access a third-party service from a user device on a telecommunications network. The authenticating information may include information that uniquely identifies users such as credentials or passcodes. For example, authenticating information may include a user's name, address (physical, electronic or both, and other information that is known to the telecommunications system because the user subscribes to a service plan of the network carrier. The authenticating information is based on the network-based identifier for the user of the user device on the telecommunications system. Thus, the ability to authenticate a user depends on the network-based identifier being a reliable means for identifying a user of a user device on a telecommunications network. As such, the network-based identifier is obtained based on the connection of the user device to the telecommunications network, which has access information that can reliably identify users of the network carrier.

The rules engine 408 applies various rules to a current promotion, to determine a user's eligibility at a point in time of redemption. Such rules may be stored by the rules engine 408 and/or provided from external databases, such as databases associated with the third-party service provider 410. The rules engine 408 may access and apply any of the following rules when determining user eligibility for a third-party service: inventory restriction rules, such as rules that identify or constrain a promotion to a certain number of redemptions (e.g., only the first N redemptions qualify); individual or user restriction rules, such as rules that limit access to a promotion by any user, customer, or individual (e.g., only one redemption per customer); group restriction rules, such as rules that limit access to a promotion by any group of individuals (e.g., only one redemption per family or group of users that share a single network identifier); user device restriction rules, such as rules that limit access to a promotion from a certain device (e.g., only redeemable if user has a certain device make/model and/or device type, such as a tablet); location restriction rules, such as rules that limit access to a promotion to a certain location (e.g., only redeemable within the United States); time restriction rules, such as rules that limit access to a promotion within a certain time period (e.g., only redeemable within January 2019); and so on.

The rules engine 408 may apply individual rules and/or any combination of rules when determining eligibility. For example, a promotion for 25 percent off a third-party service may restrict eligibility to users on smart phones within the United States that redeem the promotion during a particular time frame. In some cases, the eligibility module 404 may perform other screening or filtering of users when determining eligibility. For example, the eligibility module 404 may access a billing system and determine whether a user is current with a network account. As another example, the eligibility module 404 may determine whether the user has continued with a prepaid account.

The rules engine 408, in applying the various restriction rules, utilizes information known from the user's subscription to a service plan of the network carrier, as well as obtaining information from other information sources, such as sources associated with providing the telecommunications network to users. For example, the rules engine 408 can access, receive, or retrieve information from a variety of different network-based data sources or components and/or from partner entities. For example, the rules engine 408 can retrieve information from the user's home subscriber server (HSS), or home location register (HLR), or subscriber information for the user. Further, the rules engine 408 can retrieve, from databases managed by the network carrier, an international mobile subscriber identity (IMSI) information or mobile station international subscriber directory number (MSISDN) information, and/or billing account number (BAN) information for the user.

In some embodiments, the rules engine 408 can retrieve, from a policy and charging rules function (PCRF) node of the telecommunications network, a current billing policy and/or charging policy associated with the user and/or applied within the network. For example, the PCRF may collect and rate, in real-time or near real-time, data and other transactions within the telecommunications network, and performs actions based on such collection or management of charging policies and functions. The rules engine 408, utilizing information of a current or dynamic charging policy, may, in real-time or near real-time, adjust the eligibility of any promotion, based on a current status of the charging policy within the telecommunications network.

The rules engine 408 can use some, or all, of the retrieved information by comparing the retrieved subscriber information, the retrieved IMSI or MSISDN information, the BAN information, and/or the current billing policy (or, charging policy) to determine whether the user is eligible for provisioning of the third-party service. Thus, the components of the telecommunications server 400 can perform various functions and/or processes to facilitate redemption of third-party services by users of user devices on the telecommunications network.

FIG. 5 is a flow diagram illustrating a method performed in part by a telecommunications system to transparently provision a third-party service through a user device on a telecommunications network of a network carrier. In this example, a user's wireless mobile device (e.g., smartphone is communicatively coupled to the telecommunications network to access services over the network. A third-party service is administered by the service provider other than the network carrier. For example, the third-party service may be a web-based email, storage, or media service that is accessible on a user device over a telecommunications network that provides access to the web.

At 502, the third-party service provider partners with a network carrier to provide third-party services for eligible service plans as noted above. In some embodiments, the third-party service is accessible at the user device with a mobile application ("mobile app") or through a web browser. Hence, a user could access the third-party service by installing a dedicated mobile app, opening the mobile app, and registering to access the third-party service. Alternatively, a user can access the third-party service by inputting a URL into a web browser, where the URL accesses a website of third-party service provider. The user then registers to access the third-party service through the web browser. In either case, the registration process may require the user to manually input information that identifies the user and to create a username or password to access the service later. The network carrier and third-party service provider can partner in a variety of ways. For example, a new subscription for a service plan of the network carrier may include free or discounted access to the third-party service for a limited time.

In 504, the user subscribes the user device for a service plan of the network carrier to utilize a telecommunications network. For example, the user may subscribe to a service plan by going into a store or purchasing the plan online. The available service plans are priced for different options or services. For example, a lower-priced service plan may offer less data usage compared to a higher priced service plan. To incentivize purchasing a service plan, the network carrier may offer the third-party service for free or at a discounted price. Thus, a customer that signs-up for an eligible service plan can access the third-party service for free or at a discounted price.

In 506, the subscribed user device receives a message to access the third-party service at the user device or a mechanism is enabled at the user device to access the third-party service at the user device. In one example, an SMS text message is sent by the third-party service provider over the telecommunications network to the user device. In another example, the network carrier sends the SMS text message or enables the control to initiate the third-party service.

In 508, the user device receives user input to access the third-party service. For example, the SMS message can include a clickable link to redeem the bonus service. Hence, the user device receives the SMS text message to redeem the bonus service by clicking on a link. In another example, a control on the user device (e.g., graphical button) is enabled and can be actuated by the user to redeem the third-party service. Thus, the user can click on the link or actuate the enabled control to initiate the third-party service. The user input or an indication of the user input can then be communicated to the network carrier or third-party service provider to initiate the third-party service for the user.

In 510, the telecommunications system receives an indication that the user device received user input to initiate the bonus service. The message may include content that can be used to identify the user or user device, which can be used to identify the subscribed service plan and whether that service plan is eligible for the bonus service. In one embodiment, the indication is that the user clicked on the link in the SMS text message to access the bonus service. In another example, the indication is that the user interacted with a control to access the bonus service. The telecommunications system responds to the received indication by initiating a background process to transparently provision the bonus service for the user device. The background process facilitates authentication of the user and activation of the bonus service in a manner that requires less or no additional input from the user.

In 512, the telecommunication system responds to the received indication by obtaining a network-based identifier that uniquely identifies the user and/or the user device on the telecommunications network. The network-based identifier may be based on a network connection of the user device over the telecommunications network on which the request for the bonus service was transmitted. An example of the network-based identifier is an IP address of the user device on the telecommunications network on which the indication was transmitted. In one example, the link in the message is a hyperlink to an online resource. When clicked, the link causes the user device to transmit HTTP or HTTPS packets over the telecommunications network. The packets include source information such as the user device's IP address. If HTTPS is utilized, the source address can be determined from a terminal point such as a load balancer.

A security server of the telecommunications system may store a database that associates the network-based identifier to the user's subscribed service plan. In some embodiments, the database stores numerous network-based identifiers that uniquely identify different users and their subscribed service plans, as well as eligibility for third-party services. As such, the security server can be queried based on the network-based identifier to determine whether a user is eligible for a bonus service.

In 514, the telecommunications system determines that the user is eligible for the bonus service by identifying the user based on the network-based identifier and determining that the user's subscribed service plan is eligible for the bonus service. For example, the telecommunications system can query the security server (or a billing or charging system) of the network carrier for the user's subscribed service plan. The telecommunications system can compare the subscribed service plan to any bonus services that are available for eligible service plans of the network carrier. The telecommunications system then determines that the subscribed service plan is eligible for the third-party service.

In 516, the telecommunications system communicates information to the service provider. The information is used to provision the bonus service for the user of the user device. For example, the third-party service provider can use the information to authenticate the user without needing to query the user for authenticating information such as credentials or passcodes. In one example, the telecommunications system transmits a message to the third-party service provider where the message includes information that identifies the user and authenticates that the user is eligible to redeem the bonus service based on the subscribed service plan.

In 518, the third-party service provider provisions the bonus service for the user of the user device. For example, the third-party service provider can authorize the authenticated user to access the bonus service at the user device. As such, the telecommunications system can cause the third-party service provider to provision the bonus service on the user device in response to the action taken by the user at the user device, without needing further input from the user to commence using the bonus server.

In 520, the bonus service is made accessible at the user device for the authenticated user. For example, the third-party service provider may transmit a key or passcode to the user device for the authenticated user. The key or passcode can automatically unlock access to the bonus service from the user device. In some embodiments, the information communicated from the telecommunications system can cause the third-party service provider to provision the bonus service on a dedicated application on the user device. In some embodiments, the communicated information can cause the user device to open a dedicated mobile app or web browser to render the bonus service on the user device. Thus, the information communicated to the third-party service provider can enable both activation and authentication of the third-party service based on a single input (e.g., clicking on the link) on the user device.

The provisioning process is transparent to the user because the authentication and activation is performed in the background. For example, clicking on the link could redirect the user device to open a dedicated mobile app for the bonus service, which functions instantly without needing identifying information from the user. This is enabled because the bonus service is being accessed on the telecommunications network, which can check for known identifying information to authenticate the user on behalf of the third-party service provider. Therefore, the user device can bypass or forego any request for the user to supply authenticating information to activate and access the bonus service on the user device.

In 522, the user device opens a mobile app to access the bonus service or directs a web browser to access the third-party service. As such, the information communicated by the telecommunications system to the third-party service provider can cause the third-party service provider to provision the bonus service for the user device by routing the user device to the mobile app or a website on the user device.

In 524, the bonus service administered by the third-party service provider is functional on the user device. Thus, the telecommunications system causes the third-party service provider to provision the bonus service on the user device by accessing a routing the user device to a mobile app or website without needing additional input from the user.

Figure 6A:
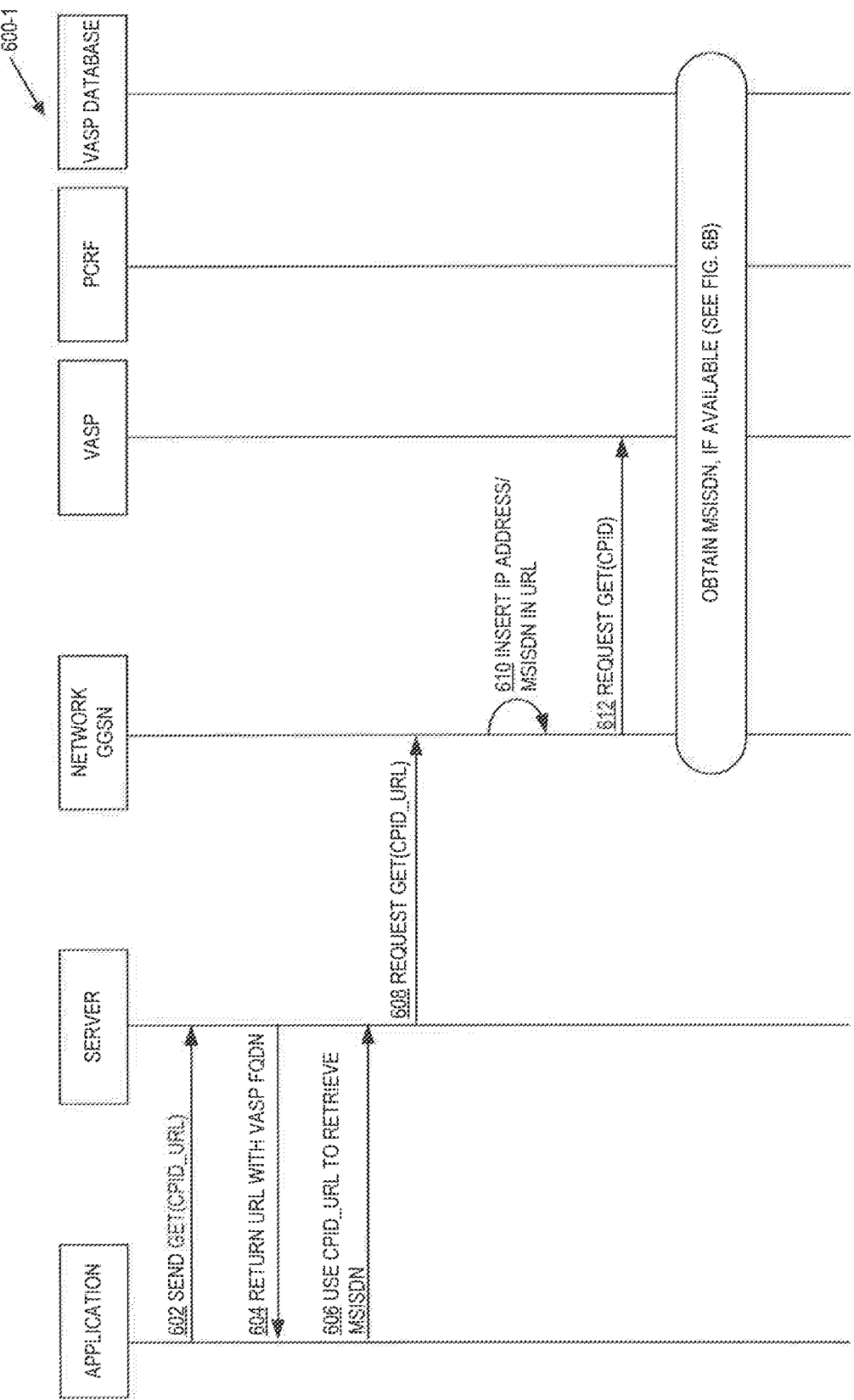
FIG. 6A is a flow diagram that illustrates a process to obtain an IP address of a customer of a telecommunications network.

FIG. 6A is a flow diagram that illustrates a process to obtain an IP address of a customer of a telecommunications network service provider. The IP address can be used to transparently activate and/or authenticate the customer for the third-party service (E.G., GOOGLE ONE, AMAZON PRIME). In 602, a mobile app of the third-party service on the customer's user device requests a customer profile identifier (CPID) through, for example, a URL request associated with the third-party service. As shown, for example, the app can send a getCPID_URL request to the server. In 604, the server returns the URL and a fully qualified domain name (FQDN) of the value-added services platform (VASP) of the telecommunications network. The VASP interfaces with the third-party service provider and other partners of the telecommunications network. In 606, the app uses the returned information to retrieve the MSISDN through the server. For example, in 608, the server sends a getCPID_URL request to the network gateway GPRS support node (GGRS) of the telecommunications network. In 610, the network GGSN inserts the customer's IP address or MSISDN in the URL request. In 612, the network GGSN sends a getCPID request to the VASP to obtain the encrypted MSISDN.

Figure 6B:
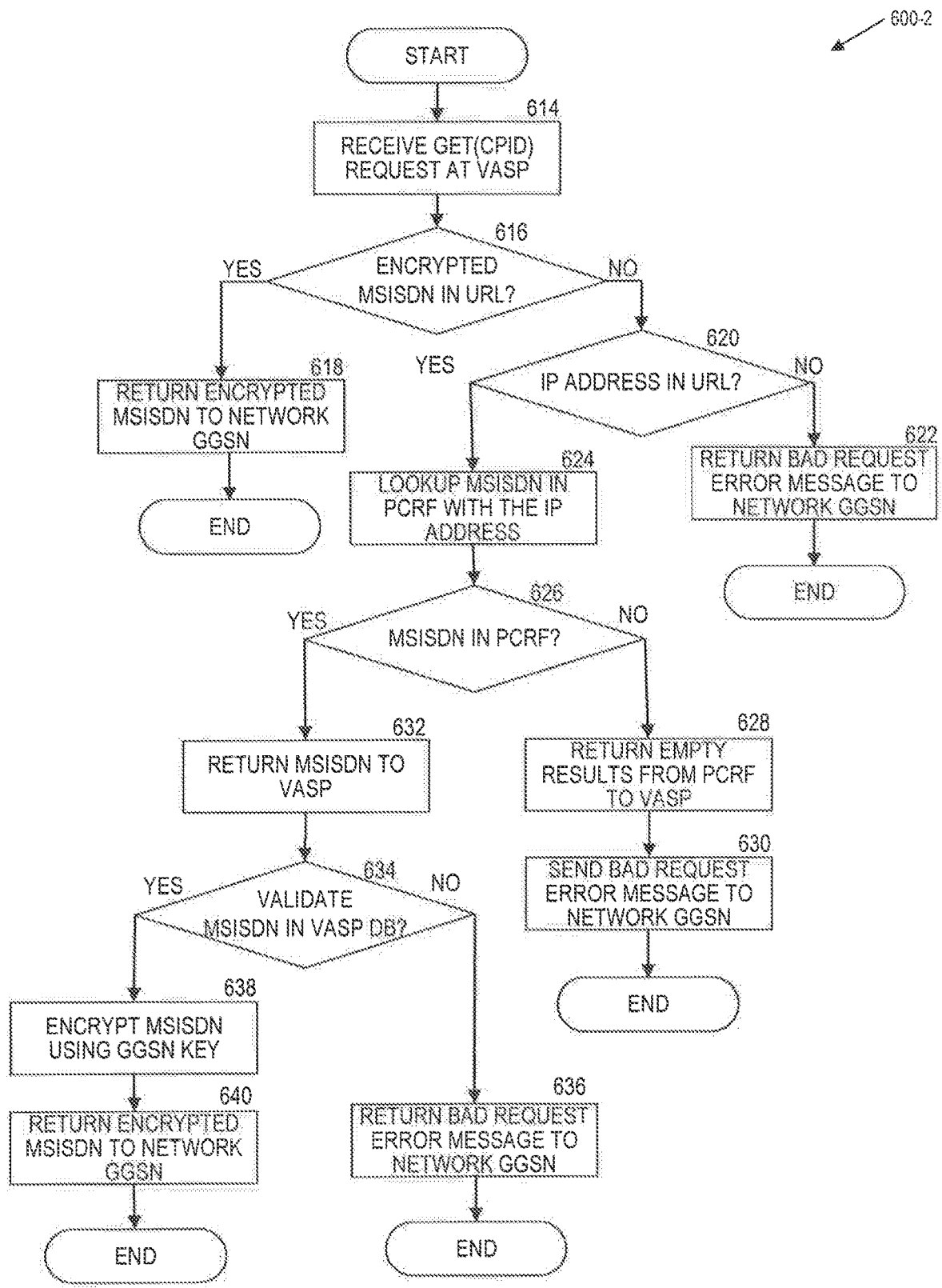
FIG. 6B is a flow diagram that illustrates a process to obtain a customer's encrypted mobile station international subscriber directory number (MS ISDN).

FIG. 6B is a flow diagram that illustrates a process 600-2 to obtain the encrypted MSISDN, which can be used to transparently authenticate the customer for the third-party service. In 614, the VASP receives a getCPID request from the network GGSN. In 616, the VASP checks for the encrypted MSISDN in the URL. In 618, the VASP finds the encrypted MSISDN in the URL, which is then returned to the network GGSN. In contrast, in 620, the VASP does not find the encrypted MSISDN in the URL and, as such, checks whether the IP address is in the URL. In 622, the VASP determines that the URL does not include the IP address and, as such, returns a bad request error message to the network GGSN. In 624, the VASP finds the IP address in the URL and uses the IP address to perform a lookup for the MSISDN in the PCRF node.

In 626, the PCRF checks for the MSISDN based on the IP address. In 628, the PCRF did not find the MSISDN and, as such, sends empty results to the VASP. In 630, the VASP returns a bad request error message to the network GGSN. In 632, the PCRF finds the MSISDN based on the IP address and sends the MSISDN to the VASP.

In 634, the VASP validates whether the VASP database has the MSISDN. In 636, the VASP did not find the MSISDN in the database and, as such, returns a bad request error message to the network GGSN. In 638, the VASP validates the MSISDN with the database and, as such, encrypts the MSISDN using the GGSN key. In 640, the encrypted MSISDN is included in the URL that the VASP returns to the network GGSN.

Figure 7:
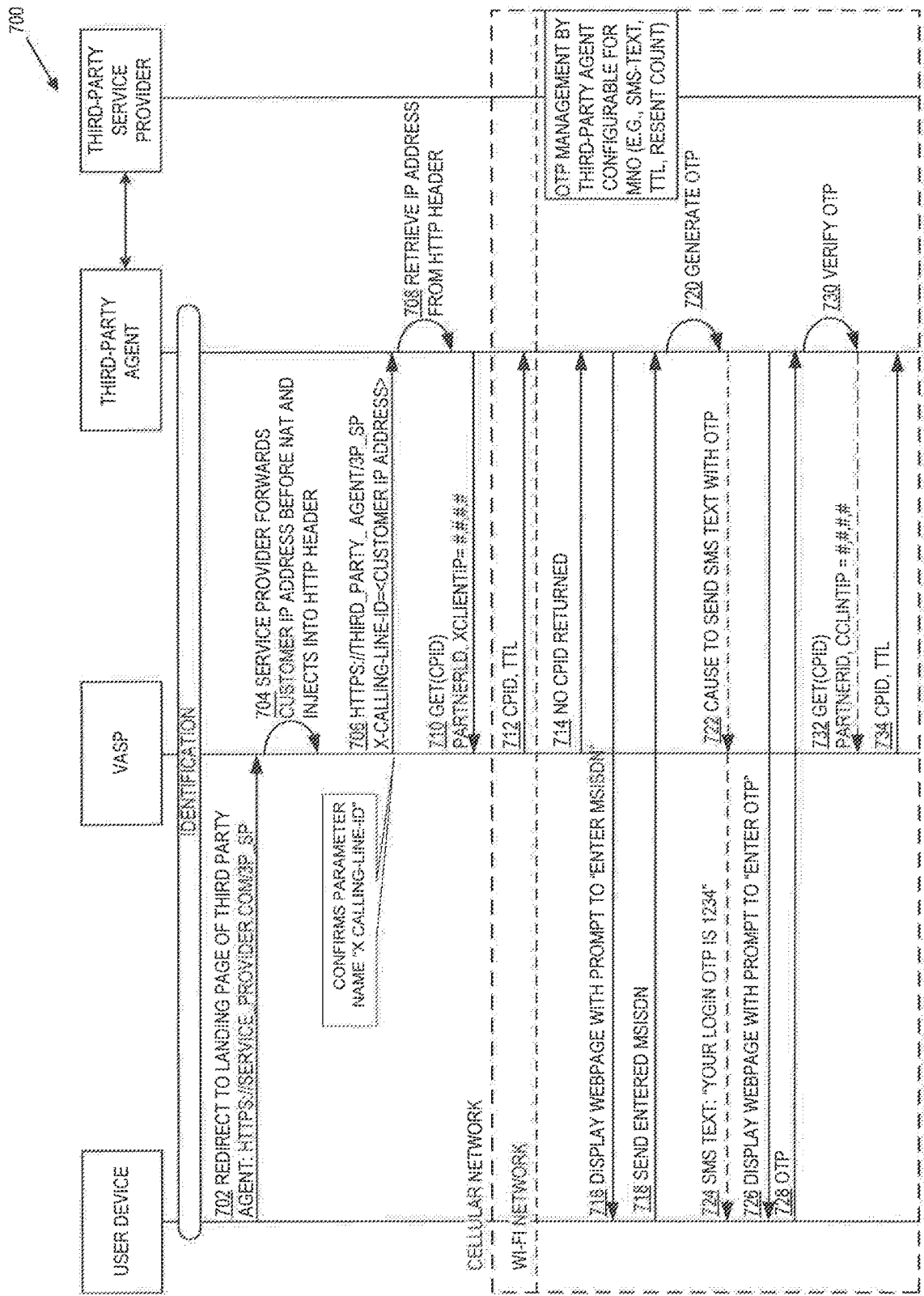
FIG. 7 is a flow diagram that illustrates a process for authenticating a customer of a telecommunications network with a third-party service based on the customer's IP address.

FIG. 7 is a flow diagram that illustrates a process 700 for authenticating a customer of a telecommunications service provider with a third-party service based on the customer's IP address. The process 700 can include a fallback one-time-password (OTP) authentication process for a failed authentication on a cellular network.

In the illustrated embodiment, the process 700 transparently identifies the customer of the VASP with a third-party agent (e.g., digital payment service provider) for the third-party service. In 702, the customer's user device is redirected to a landing page of a third-party agent service for the third-party service. For example, a web browser on the user device can be routed to a webpage for the third-party service. In 704, the VASP prepares to forward the customer's IP address, before network address translation (NAT), by embedding the IP address in the HTTP header. In this example, the proxy (third-party agent) resides in the mobile network operator (MNO) network.

In 706, the VASP requests a URL of the third-party agent for the third-party service. The VASP confirms the parameter name "X-calling-line-ID" based on the IP address. In 708, the third-party agent service retrieves the IP address from the HTTP header. In 710, the third-party agent service sends a getCP ID request to the VASP. The request can pass a partner ID and the client IP address of the original request. In 712, the VASP returns the requested CPID and, for example, a time-to-live (TTL) for the CPID to the third-party agent service.

On the other hand, in 714, the VASP did not return the requested CPID to the third-party agent service. When this condition occurs, the process 700-1 has a fallback operation to authenticate a customer over a Wi-Fi network. For example, in 716, a webpage displays on the user device to prompt the customer to enter the customer's MSISDN. In 718, the MSISDN entered by the customer is sent to the third-party agent service. In 720, the third-party agent service generates a one-time-password (OTP) for the MSISDN. In 722, the third-party agent service causes the VASP to send an SMS text including the OTP (e.g., a pin number) to the user device. In 724, the VASP sends the SMS text to the user device, which may display "Your Login OTP is 1234."

In 726, another webpage displays on the user device to prompt the user for the OTP. In 728, the user enters the OTP at the user device, and the OTP is sent to the third-party agent service. In 730, the third-party agent service verifies the received OTP. In 732, the third-party agent service sends a fallback getCPID message to the VASP. In 734, the VASP returns the CPID and associated TTL to the third-party agent service provider. Here, OTP management is performed by the third-party agent and is configurable for MNO (e.g., SMS text, time-to-live, re-sent count).

Accordingly, the network carrier utilizes the telecommunications system to facilitate transparent provisioning of third-party services to its own customers of the telecommunications network. The telecommunications system can readily determine the eligibility of a subscribed service plan by using the information collected and stored by various components of a telecommunications system and associated with the network carrier. Thus, the network carrier enables a secure but transparent provisioning of third-party services to customers by relying on its own network-based components to provide such rewards immediately while eliminating the cognitive burden on the customers to authenticate and activate the bonus service from the user device.

Figure 8:
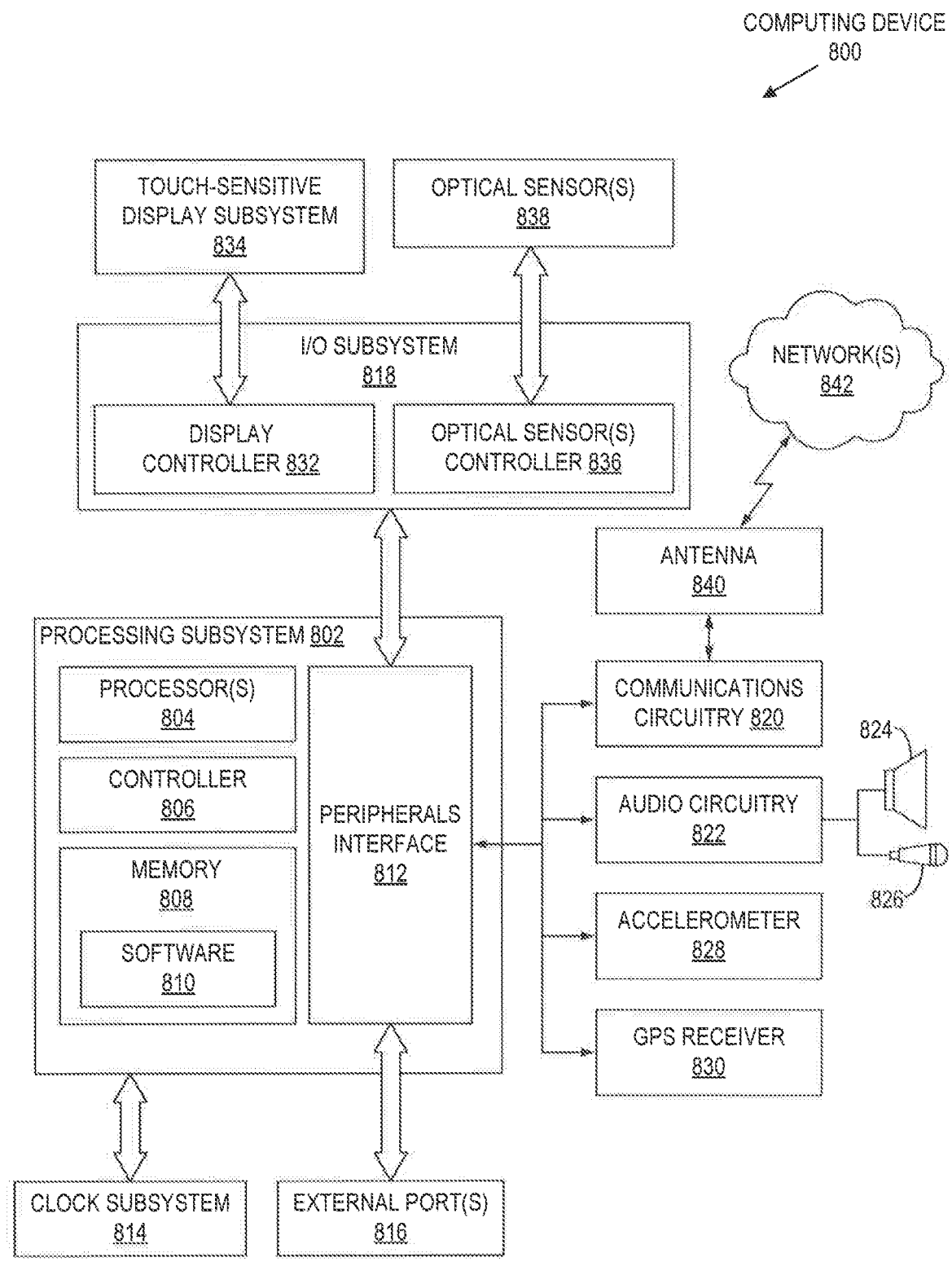
FIG. 8 is a block diagram illustrating an example of a computing device in which aspects of the disclosed technology can be embodied.

FIG. 8 is a block diagram illustrating an example computing device (e.g., user device, telecommunications system server) in which aspects of the disclosed technology can be embodied. For example, the method 500 or processes 600-1, 600-2, or 700 may be performed in part by the computing device 800 of the telecommunications system. The computing device 800 may include generic components and/or components specifically designed to carry out the disclosed technology. The computing device 800 may be a standalone device or part of a distributed system (e.g., network environment 300) that spans networks, locations, machines, or combinations thereof. For example, components of the computing device 800 may be included in or coupled to a system-on-chip (SOC), a single-board computer (SBC) system, a desktop or laptop computer, a kiosk, a mainframe, a mesh of computer systems, or combinations thereof.

In some embodiments, the computing device 800 can operate as a server device or a client device in a client-server network environment, or as a peer machine in a peer-to-peer system. In some embodiments, the computing device 800 may perform one or more steps of the disclosed embodiments in real-time, in near real-time, offline, by batch processing, or by combinations thereof.

The computing device 800 includes a processing subsystem 802 that includes one or more processors 804 (e.g., central processing units (CPUs), application specific integrated circuits (ASICs), and/or field programmable gate arrays (FPGAs)), a memory controller 806, memory 808 that can store software 810, and a peripherals interface 812. The memory 808 may include volatile memory (e.g., random-access memory (RAM)) and/or non-volatile memory (e.g., read-only memory (ROM)). The memory 808 can be local, remote, or distributed. The computing device 800 can also include a clock subsystem 814 that controls a timer for use in some embodiments. The components of the computing device 800 are interconnected over a bus (not shown) operable to transfer data between hardware components.

The peripherals interface 812 is coupled to one or more external ports 816 which can connect to an external power source, for example. The peripherals interface 812 is also coupled to an I/O subsystem 818. Other components coupled to the peripherals interface 812 include communications circuitry 820, audio circuitry 822 for a speaker 824 and a microphone 826, an accelerometer 828, a GPS receiver 830 (or global navigation satellite system (GLONASS) or other global navigation system receiver), and other sensors (not shown). The GPS receiver 830 is operable to receive signals concerning the geographic location of the computing device 800. The accelerometer 828 can be operable to obtain information concerning the orientation (e.g., portrait or landscape) of the computing device 800.

The I/O subsystem 818 includes a display controller 832 operative to control a touch-sensitive display system 834, which further includes the touch-sensitive display of the computing device 800. The I/O subsystem 818 also includes an optical sensor(s) controller 836 for one or more optical sensors 838 of the computing device 800. The I/O subsystem 818 includes other components (not shown) to control physical buttons.

The communications circuitry 820 can configure the antenna 840 of the computing device 800. In some embodiments, the antenna 840 is structurally integrated with the computing device 800 (e.g., embedded in the housing or display view) or coupled to the computing device 800 through the external ports 816. The communications circuitry 820 can convert electrical signals to/from electromagnetic signals that are communicated by the antenna 840 to networks 842 or other devices. For example, the communications circuitry 820 can include radio frequency (RF) circuitry that processes RF signals communicated by the antenna 840.

The communications circuitry 820 can include circuitry for performing well-known functions. Examples of the communications circuitry 820 include an RF transceiver, one or more amplifiers, a tuner, oscillators, a digital signal processor, a CODEC chipset, a subscriber identity module (SIM card or eSIM), and so forth. The communications circuitry 820 may communicate wirelessly via the antenna 840 with the networks 842 (e.g., the Internet, an intranet and/or a wireless network, such as a cellular network, a wireless local area network (LAN) and/or a metropolitan area network (MAN)) or other devices.

The software 810 can include an OS software program, application software programs, and/or modules (e.g., as described with respect to FIG. 4). For example, a GPS module can determine the location of the computing device 800 based on the GPS signals received by the GPS receiver 830. The GPS module can provide this information to components of the computing device 800 for use in various applications (e.g., to provide location-based contextual information).

A software program, when referred to as "implemented in a computer-readable storage medium," includes computer-readable instructions stored in the memory (e.g., memory 808). A processor (e.g., processor 804) is "configured to execute a software program" when at least one value associated with the software program is stored in a register that is readable by the processor. In some embodiments, routines executed to implement the disclosed embodiments may be implemented as part of OS software (e.g., Microsoft Windows and Linux) or a specific software application, component, program, object, module, or sequence of instructions referred to as "computer programs."

Computer programs typically comprise one or more instructions set at various times in various memory devices of the computing device 800, which, when read and executed by the processor 804, will cause the computing device 800 to execute functions involving the disclosed embodiments. In some embodiments, a carrier containing the aforementioned computer program product is provided. The carrier is one of an electronic signal, an optical signal, a radio signal, or a non-transitory computer-readable storage medium (e.g., the memory 808).

Operation of the memory 808, such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

The computing device 800 may include other components that are not shown nor further discussed herein for the sake of brevity. One having ordinary skill in the art will understand any hardware and software that is included but not shown in FIG. 8. While embodiments have been described in the context of fully functioning computing devices, those skilled in the art will appreciate that the various embodiments are capable of being distributed as a program product in a variety of forms and that the disclosure applies equally, regardless of the particular type of machine or computer-readable media used to actually effect the embodiments.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

What is claimed is:

1. A system for transparently provisioning a third-party service for a user device of a telecommunications network of a network carrier to enable a user of the user device to seamlessly redeem the third-party service administered by a service provider other than the network carrier, the system comprising:
   one or more memories that store:
      a plurality of identifiers,
      a plurality of service plans for the network carrier,
      a plurality of users that are each uniquely identifiable by one of the plurality of identifiers and wherein each of the plurality of users subscribe to at least one of the plurality of service plans,
      a list including the third-party service and an associated eligibility criterion to redeem access to the third-party service, and
      instructions to process input from the user on the user device communicatively coupled to the telecommunications network;
   one or more processors configured to execute the instructions stored on the one or more memories in response to receiving an indication that the user device on the telecommunications network issued a command based on input by the user to redeem access to the third-party service on the user device by transparently provisioning the third-party service for the user,
   wherein the input is in response to the user clicking on a link presented in a text-based message received by the user device, and
   wherein execution of the instructions causes the system to:
      retrieve one identifier of the plurality of identifiers that uniquely identifies the user device on the telecommunications network,
         wherein the plurality of identifiers includes an IP address of the user device;
      determine that the user device is eligible to receive the third-party service by causing the system to:
         interrogate the one or more memories for a service plan, of the plurality of service plans, which is associated with the user device based on the one identifier,
         evaluate eligibility of the user device or the service plan to redeem the third-party service based on the eligibility criterion, and
         determine that the user device or the service plan is eligible to redeem the third-party service; and
      transparently provision the third-party service for the user by authenticating the user device and activating the third-party service for the user device without requiring the user to register for the third-party service redemption or provide additional input.

2. The system of claim 1, wherein the one identifier includes the IP address of the user device that received the text-based message.

3. The system of claim 1 further caused to:
   cause the user device to bypass a request for additional input from the user, wherein the request is otherwise required to authenticate the user and activate the third-party service on the user device; and
   cause the service provider to provision the third-party service on the user device without needing further input by the user to authenticate the user.

4. The system of claim 1, wherein the one identifier is based on a network connection of the user device to the telecommunications network on which the indication was communicated to the telecommunications network.

5. The system of claim 1, wherein the one identifier network-based identifier includes an international mobile subscriber identity (IMSI), a mobile station international subscriber directory number (MSISDN), or a billing account number (BAN) for the user.

6. The system of claim 1, wherein the user device is a wireless handheld mobile device communicatively coupled to the telecommunications network.

7. The system of claim 1 further caused to:
   cause the third-party service provider to provision the third-party service on a dedicated application on the user device or by accessing a website on a web browser on the user device.

8. The system of claim 1 further caused to:
   cause the third-party service provider to open a dedicated application or web browser to provision the third-party service on the user device.

9. A method for transparently provisioning a third-party service for a user device of a telecommunications network of a network carrier to enable a user of the user device to seamlessly redeem the third-party service administered by a service provider other than the network carrier, the method comprising:
   storing in one or more memories:
      a plurality of identifiers;
      a plurality of service plans for the network carrier;
      a plurality of users that are each uniquely identifiable by one of the plurality of identifiers and wherein each of the plurality of users subscribe to at least one of the plurality of service plans;

a list including the third-party service and an associated eligibility criterion to redeem access to the third-party service; and instructions to process input from the user on the user device communicatively coupled to the telecommunications network;

receiving an indication that the user device on the telecommunications network issued a command based on input by the user to redeem access to the third-party service on the user device by transparently provisioning the third-party service for the user, wherein the input is in response to the user clicking on a link presented in a text-based message received by the user device;

responsive to receiving the indication that the user device on the telecommunications network issued the command:

retrieving one identifier of the plurality of identifiers that uniquely identifies the user device on the telecommunications network, wherein the plurality of identifiers includes an IP address of the user device;

determining that the user device is eligible to receive the third-party service by:

interrogating the one or more memories for a service plan, of the plurality of service plans, which is associated with the user device based on the one identifier, evaluating eligibility of the user device or the service plan to redeem the third-party service based on the eligibility criterion, and determining that the user device or the service plan is eligible to redeem the third-party service; and transparently provisioning the third-party service for the user by authenticating the user device and activating the third-party service for the user device without requiring the user to register for the third-party service redemption or provide additional input.

10. The method of claim 9, wherein the one identifier includes the IP address of the user device that received the text-based message.

11. The method of claim 9, wherein the one identifier includes an international mobile subscriber identity (IMSI), a mobile station international subscriber directory number (MSISDN), or a billing account number (BAN) for the user.

12. The method of claim 9 further comprising:
causing the third-party service provider to provision the third-party service on a dedicated application on the user device.

13. The method of claim 9 further comprising:
causing the third-party service provider to provision the third-party service by accessing a website on a web browser on the user device.

14. At least one non-transitory computer-readable storage medium storing instructions to be executed by at least one processor, wherein the instructions are for transparently provisioning a third-party service for a user device of a telecommunications network of a network carrier to enable a user of the user device to seamlessly redeem the third-party service administered by a service provider other than the network carrier, the processor being caused to:

store in one or more memories:
a plurality of identifiers,
a plurality of service plans for the network carrier,
a plurality of users that are each uniquely identifiable by one of the plurality of identifiers and wherein each of the plurality of users subscribe to at least one of the plurality of service plans, a list including the third-party service and an associated eligibility criterion to redeem access to the third-party service, and instructions to process input from the user on the user device communicatively coupled to the telecommunications network;

execute the stored instructions in response to receiving an indication that the user device on the telecommunications network issued a command based on input by the user to redeem access to the third-party service on the user device by transparently provisioning the third-party service for the user, wherein the input is in response to the user clicking on a link presented in a text-based message received by the user device, and wherein execution of the instructions causes the processor to:

retrieve one identifier of the plurality of identifiers that uniquely identifies the user device on the telecommunications network, wherein the plurality of identifiers includes an IP address of the user device;

determine that the user device is eligible to receive the third-party service by causing the system to:

interrogate the one or more memories for a service plan, of the plurality of service plans, which is associated with the user device based on the one identifier, evaluate eligibility of the user device or the service plan to redeem the third-party service based on the eligibility criterion, and determine that the user device or the service plan is eligible to redeem the third-party service; and transparently provision the third-party service for the user by authenticating the user device and activating the third-party service for the user device without requiring the user to register for the third-party service redemption or provide additional input.

15. The non-transitory computer-readable storage medium of claim 14, wherein the one identifier includes the IP address of the user device that received the text-based message.

16. The non-transitory computer-readable storage medium of claim 14, wherein the one identifier is based on a network connection of the user device to the telecommunications network on which the indication was communicated to the telecommunications network.

17. The non-transitory computer-readable storage medium of claim 14, wherein the one identifier includes an international mobile subscriber identity (IMSI), a mobile station international subscriber directory number (MSISDN), or a billing account number (BAN) for the user.

18. The non-transitory computer-readable storage medium of claim 14, wherein the user device is a wireless handheld mobile device communicatively coupled to the telecommunications network.

19. The non-transitory computer-readable storage medium of claim 14 further causing the processor to:
cause the third-party service provider to provision the third-party service on a dedicated application on the user device.

20. The non-transitory computer-readable storage medium of claim 14 further causing the processor to:

cause the third-party service provider to provision the third-party service by accessing a website on a web browser on the user device.

\* \* \* \* \*